(12) United States Patent
Liu et al.

(10) Patent No.: US 11,170,808 B1
(45) Date of Patent: Nov. 9, 2021

(54) DUAL FREE LAYER READER HEAD WITH MAGNETIC SEED LAYER DECOUPLED FROM SHIELD

(71) Applicant: Western Digital Technologies, Inc., San Jose, CA (US)

(72) Inventors: Xiaoyong Liu, San Jose, CA (US); Ji Li, Shenzhen (CN); Goncalo Marcos Baião de Albuquerque, San Jose, CA (US); Daniele Mauri, San Jose, CA (US); Yukimasa Okada, Cupertino, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/149,491

(22) Filed: Jan. 14, 2021

(51) Int. Cl.
*G11B 5/39* (2006.01)

(52) U.S. Cl.
CPC .......... *G11B 5/3932* (2013.01); *G11B 5/3909* (2013.01); *G11B 5/3912* (2013.01)

(58) Field of Classification Search
CPC .... G11B 5/3932; G11B 5/3912; G11B 5/3909
See application file for complete search history.

(56) References Cited

U.S. PATENT DOCUMENTS

| 8,390,963 B2 | 3/2013 | Dimitrov et al. |
| 8,537,502 B1 * | 9/2013 | Park ...................... G11B 5/3116 360/324.11 |
| 8,837,092 B2 * | 9/2014 | Covington ........... G11B 5/3932 360/324 |
| 8,970,994 B2 | 3/2015 | Sapozhnikov et al. |
| 9,047,893 B1 * | 6/2015 | Gao ........................ G11B 5/398 |
| 9,070,381 B1 * | 6/2015 | Yang ..................... G11B 5/3906 |
| 9,147,404 B1 | 9/2015 | Luo et al. |
| 9,230,576 B1 | 1/2016 | Gill et al. |
| 9,361,914 B1 * | 6/2016 | Kaiser ................... G11B 5/3909 |
| 9,508,365 B1 | 11/2016 | Zheng et al. |
| 10,460,752 B2 * | 10/2019 | Freitag ................... G11B 5/314 |
| 10,714,131 B1 | 7/2020 | Wu |
| 10,777,222 B1 * | 9/2020 | Liu ....................... G11B 5/3906 |

(Continued)

OTHER PUBLICATIONS

Maat et al. "Physics and Design of Hard Disk Drive Magnetic Recording Read Heads," Y. Xu et al. (eds.), Handbook of Spintronics, Springer, Dordrecht, pp. 977-1028, https://doi.org/10.1007/978-94-007-6892-5_35.

(Continued)

*Primary Examiner* — Brian E Miller
(74) *Attorney, Agent, or Firm* — Patterson & Sheridan, LLP; Steven H. Versteeg (57) ABSTRACT

The present disclosure generally relates to magnetic read heads comprising a dual free layer (DFL) structure. The magnetic read head comprises a first shield, a second shield, and a DFL structure disposed between the first and second shields. The DFL structure comprises a magnetic seed layer, a first free layer, and a second free layer. A non-magnetic spacer layer is disposed between and in contact with the first shield and the magnetic seed layer of the DFL structure at a media facing surface. A material and a thickness of the non-magnetic spacer layer is selected to control the coupling between the first shield and the magnetic seed layer of the DFL structure.

20 Claims, 8 Drawing Sheets

(56) References Cited

U.S. PATENT DOCUMENTS

| | | | | |
|---|---|---|---|---|
| 10,950,260 | B1* | 3/2021 | Freitag | G01D 5/16 |
| 2014/0254047 | A1* | 9/2014 | Sapozhnikov | G11B 5/3929 |
| | | | | 360/319 |
| 2015/0084624 | A1* | 3/2015 | Singleton | G01R 33/09 |
| | | | | 324/252 |
| 2015/0243308 | A1* | 8/2015 | Takagishi | G11B 5/11 |
| | | | | 360/244 |
| 2017/0154643 | A1* | 6/2017 | Nishioka | G11B 5/3945 |
| 2017/0194023 | A1* | 7/2017 | Okawa | G01R 33/0076 |

OTHER PUBLICATIONS

Tuggle et al. "A Dual Free Layer Sensor With Side Shields," IEEE Transactions on Magnetics, vol. 48, No. 11, Nov. 2012, pp. 3547-3550, doi: 10.1109/TMAG.2012.2200034.

\* cited by examiner

DUAL FREE LAYER READER HEAD WITH MAGNETIC SEED LAYER DECOUPLED FROM SHIELD

CROSS-REFERENCE TO RELATED APPLICATIONS

This application claims benefit of Chinese patent application serial number 202011535194.7, filed Dec. 23, 2020, which is herein incorporated by reference.

BACKGROUND OF THE DISCLOSURE

Field of the Disclosure

Embodiments of the present disclosure generally relate to dual free layer (DFL) tunnel magnetic resistive (TMR) read heads.

Description of the Related Art

Read heads typically include an antiferromagnetic (AFM) layer, which results in a fairly large spacing between shields. A read head without an AFM layer can shrink the distance between shields while also eliminating head instabilities that come from thermal fluctuations in AFM grains.

One such read head is a dual free layer (DFL) read head that has a DFL sensor. A DFL read head does not have an AFM layer, but instead has two free layers individually stabilized longitudinally by antiferromagnetically coupled (AFC) soft bias (SB) structures on either side of the sensor between the shields. The DFL sensor operates in a scissor mode when transversally biased at the stripe back edge by a permanent magnetic or rear head bias (RHB) structure that delivers twice as high of a readout amplitude with self-noise cancellation. One major challenge in a DFL read head is that the RHB provides a strong field. The RHB field needs to not only be strong, but also needs to be uniformly applied to enable the free layers to operate in the scissor mode. When operating in scissor mode, the DFL read head can deliver much larger readout amplitudes and reduced magnetic noise.

Therefore, there is a need in the art for an improved DFL read head that can provide a stable transverse bias to each free layer of the DFL read head.

SUMMARY OF THE DISCLOSURE

The present disclosure generally relates to magnetic read heads comprising a dual free layer (DFL) structure. The magnetic read head comprises a first shield, a second shield, and a DFL structure disposed between the first and second shields. The DFL structure comprises a magnetic seed layer, a first free layer, and a second free layer. A non-magnetic spacer layer is disposed between and in contact with the first shield and the magnetic seed layer of the DFL structure at a media facing surface. A material and a thickness of the non-magnetic spacer layer is selected to control the coupling between the first shield and the magnetic seed layer of the DFL structure.

In one embodiment, a magnetic read head assembly comprises a first shield, a second shield disposed over the first shield, and a DFL structure disposed between the first shield and the second shield at a MFS. The DFL structure comprises a magnetic seed layer disposed over the first shield, a first free layer disposed over the magnetic seed layer, and a second free layer disposed over the first free layer. The magnetic read head assembly further comprises a non-magnetic spacer layer disposed between the first shield and the magnetic seed layer of the DFL structure at the MFS.

In another embodiment, a magnetic read head assembly comprises a first shield, a non-magnetic spacer layer disposed on and in contact with the first shield, the non-magnetic spacer layer being disposed at a MFS, and a TMR sensor disposed on the non-magnetic spacer layer at the MFS. The TMR sensor comprises a magnetic seed layer disposed on and in contact with the non-magnetic spacer layer, a first free layer disposed over the magnetic seed layer, and a second free layer disposed over the first free layer. The magnetic read head assembly further comprises a second shield disposed over the second free layer of the TMR sensor, wherein the non-magnetic spacer layer is configured to control a coupling of the first shield and the magnetic seed layer.

In another embodiment, a magnetic read head assembly comprises a first shield, a second shield disposed over the first shield, and a DFL structure disposed between the first shield and the second shield at a MFS. The DFL structure comprises a magnetic seed layer disposed over the first shield, a non-magnetic seed layer disposed on and in contact with the magnetic seed layer, a first free layer disposed on and in contact with the non-magnetic seed layer, a barrier layer disposed on and in contact with the first free layer, a second free layer disposed on and in contact with the barrier layer, and a cap layer disposed on and in contact with the second free layer. The magnetic read head assembly further comprises a non-magnetic spacer layer disposed between and in contact with the first shield and the magnetic seed layer of the DFL structure at the MFS, the non-magnetic spacer layer having a thickness greater than or equal to about 2 nm.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to magnetic read heads comprising a dual free layer (DFL) structure. The magnetic read head comprises a first shield, a second shield, and a DFL structure disposed between the first and second shields. The DFL structure comprises a magnetic seed layer, a first free layer, and a second free layer. A non-magnetic spacer layer is disposed between and in contact with the first shield and the magnetic seed layer of the DFL structure at a media facing surface. A material and a thickness of the non-magnetic spacer layer is selected to control the coupling between the first shield and the magnetic seed layer of the DFL structure.

It is to be understood that the magnetic recording head discussed herein is applicable to a data storage device such as a hard disk drive (HDD) as well as a tape drive, such as a tape embedded drive (TED) or an insertable tape media drive. An example TED is described in co-pending patent application entitled "Tape Embedded Drive", U.S. patent application Ser. No. 16/365,034, filed Mar. 31, 2019 and assigned to the same assignee of the instant application. Any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is to be understood that embodiments described herein is not limited to a single dual free layer (DFL) read head and may be applicable to a two-dimensional magnetic recording (TDMR) DFL read head where multiple readers are stacked together.

Figure 1:
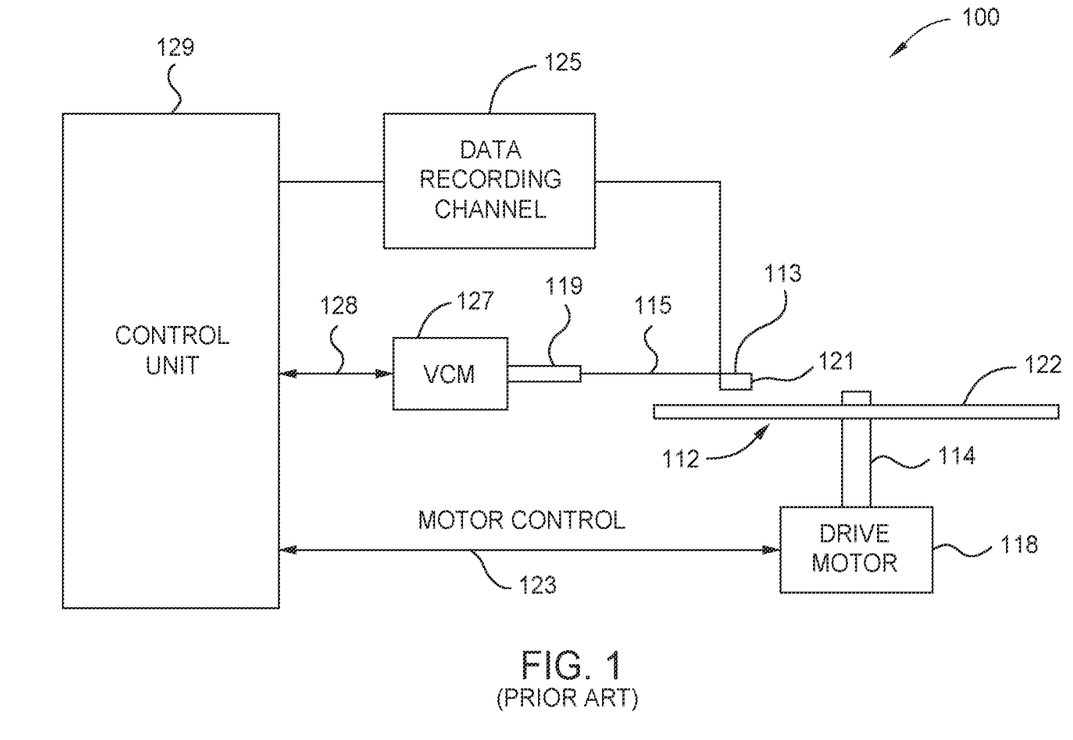
FIG. 1 is a schematic illustration of a magnetic media drive including a magnetic write head and a magnetic read head, according to various embodiments.

FIG. 1 is a schematic illustration of a magnetic media drive 100 including a magnetic write head and a magnetic read head, according to disclosed embodiments. The magnetic media drive 100 may be a single drive/device or comprise multiple drives/devices. The magnetic media drive 100 includes a magnetic recording medium, such as one or more rotatable magnetic media 112 supported on a spindle 114 and rotated by a drive motor 118. For the ease of illustration, a single disk drive is shown according to one embodiment. The magnetic recording on each magnetic media 112 is in the form of any suitable patterns of data tracks, such as annular patterns of concentric data tracks (not shown) on the magnetic media 112.

The slider 113 is positioned near the magnetic media 112. In some embodiments, the slider 113 is a plurality of sliders, where each slider 113 of the plurality of sliders supports one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the magnetic disk drive 100, the rotation of the magnetic media 112 generates an air bearing between the slider 113 and the media surface 122 which exerts an upward force or lift on the slider 113. The air bearing thus counter-balances the slight spring force of suspension 115 and supports slider 113 off and slightly above the magnetic media 112 surface by a small, substantially constant spacing during normal operation.

The various components of the magnetic disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position the slider 113 to the desired data track on the magnetic media 112. Write and read signals are communicated to and from write and read heads on the magnetic head assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
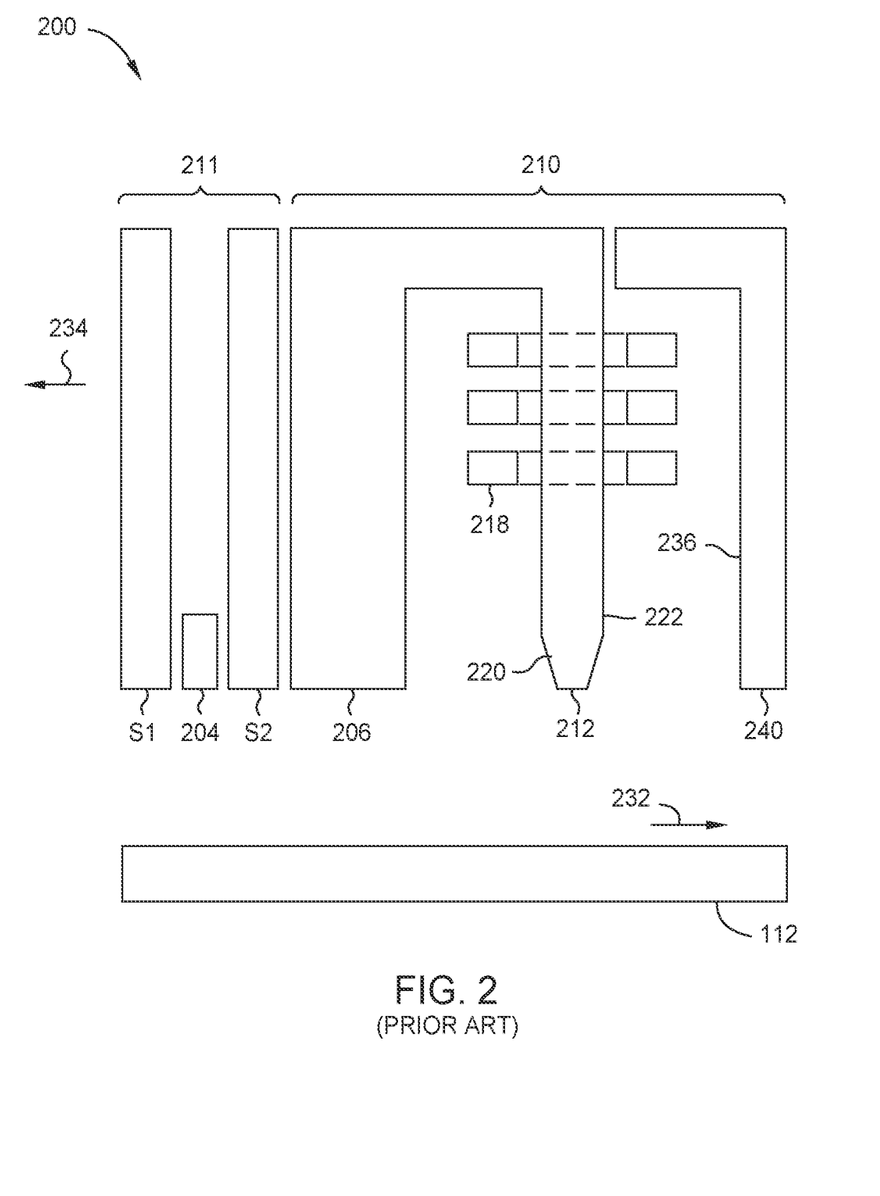
FIG. 2 is a schematic illustration of a cross-sectional side view of a head assembly facing a magnetic storage medium, according to various embodiments.

FIG. 2 is a schematic illustration of a cross-sectional side view of a head assembly 200 facing a magnetic storage medium, such as the magnetic media 112, according to disclosed embodiments. The head assembly 200 may correspond to the magnetic head assembly 121 described in FIG. 1. The head assembly 200 includes a media facing surface (MFS) 212, such as an air bearing surface (ABS), a magnetic write head 210, and a magnetic read head 211. The head assembly 200 is mounted such that the MFS 212 is facing the magnetic media 112. In FIG. 2, the magnetic media 112 moves past the write head 210 in the direction indicated by the arrow 232 and the head assembly 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap.

A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 Teslas (T) and a thickness of about 300 nanometers (nm). The main pole 220 may comprise ferromagnetic materials, typically alloys of one or more of Co, Fe and Ni. The trailing shield 240 may be a magnetic material such as NiFe alloy. In one embodiment, the trailing shield 240 has an Ms of about 1.2 T to about 1.6 T.

It is to be understood that a "dual free layer (DFL) read head/read head assembly" and a "magnetic read head/read head assembly" may be used interchangeably in the descriptions herein, for exemplary purposes.

Figure 3A:
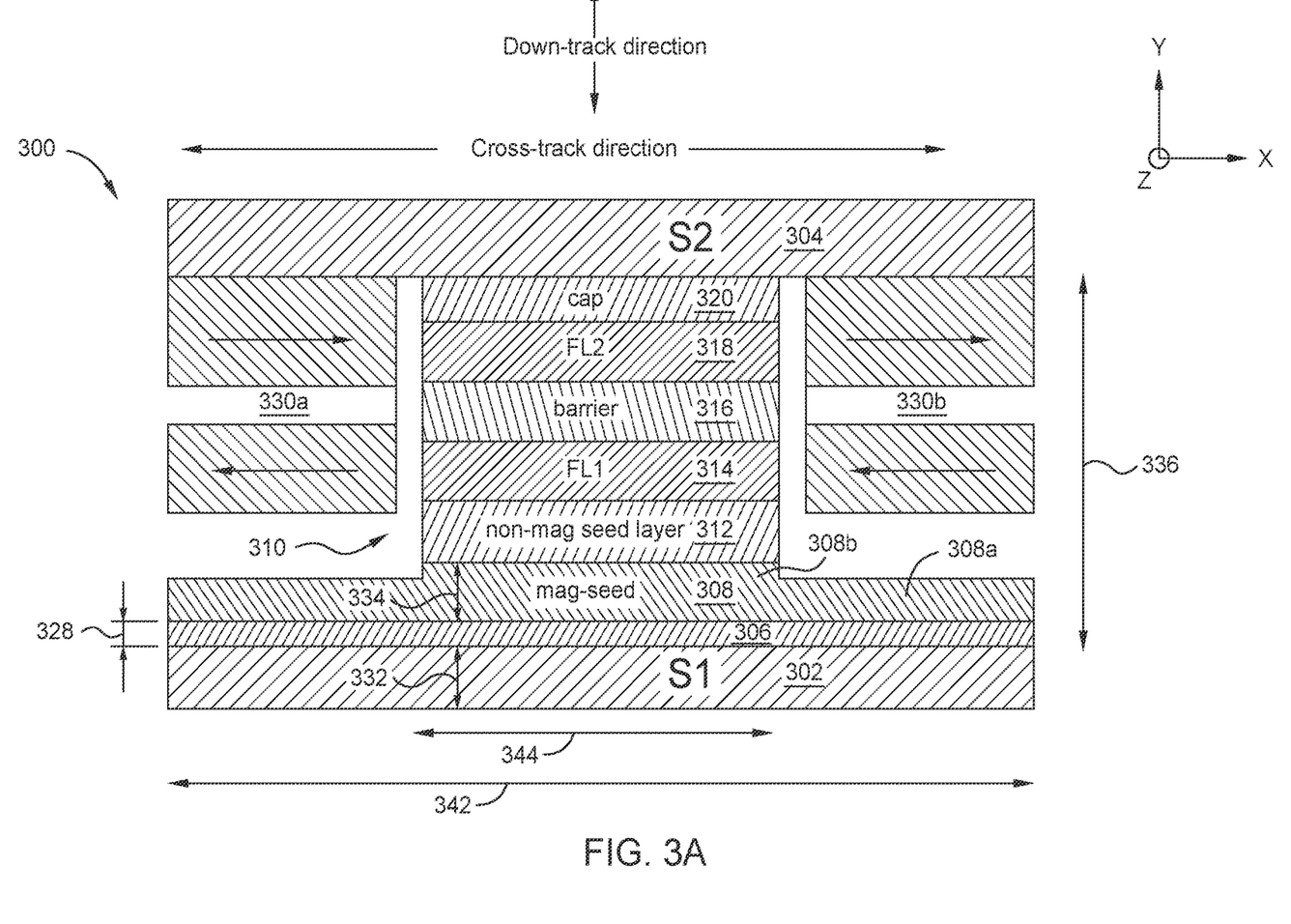
FIGS. 3A-3B illustrate various views of a magnetic read head comprising a dual free layer structure, according to disclosed embodiments.
Figure 3B:
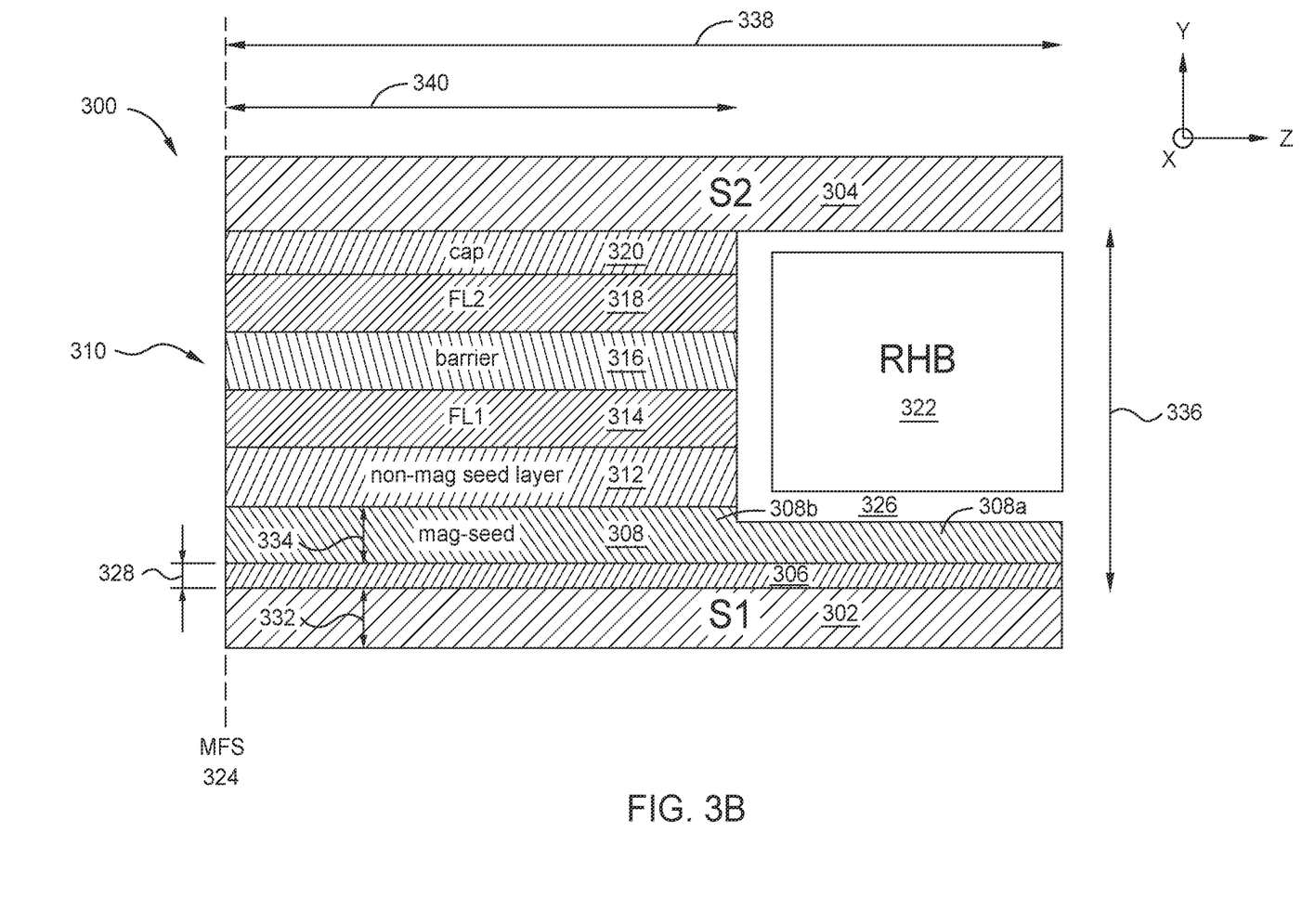

FIGS. 3A and 3B illustrate a magnetic read head 300, according to disclosed embodiments. FIG. 3A illustrates a media facing surface view of the read head 300, and FIG. 3B illustrates a cross-sectional side view of the read head 300. The read head 300 may be within a magnetic recording device, such as the magnetic media drive 100 of FIG. 1. The read head 300 comprises a first shield (S1) 302 (e.g., a bottom shield), a second shield (S2) 304 (e.g., a top shield), and a dual free layer (DFL) structure 310 disposed between the first shield 302 and the second shield 304. The DFL 310 may be referred to as a MTJ stack or a tunnel magnetoresistive (TMR) sensor, interchangeably, for exemplary purposes.

As shown in FIG. 3B, the DFL structure 310 is disposed at the MFS 324, and a rear hard bias (RHB) structure 322 is disposed behind the DFL structure 310 recessed from the MFS 324. The RHB structure 322 is disposed between the first and second shields 302, 304. An insulation layer 326 may be disposed between the DFL structure 310 and the RHB structure 322, and between the RHB structure 322 and the first and second shields 302, 304. As shown in FIG. 3A, the DFL structure 310 may be disposed between a first side shield 330a and a second side shield 330b at the MFS. The first and second side shields 330a, 300b may comprise a soft bias material or a hard bias material.

It is to be understood that embodiments described herein is not limited to a single dual free layer (DFL) read head and may be applicable to a two-dimensional magnetic recording (TDMR) DFL read head. Thus, while only one DFL structure 310 is shown in the read head 300, the read head 300 may comprise more than one DFL structure 310. For example, the read head 300 may comprise a second DFL structure disposed on top of the first DFL structure 310 in the y-direction.

The DFL structure 310 comprises a magnetic seed (mag-seed) layer 308 disposed over the first shield 302, a non-magnetic seed (non-mag seed) layer 312 disposed on the magnetic seed layer 308, a first free layer (FL1) 314 disposed on the non-magnetic seed layer 312, a barrier layer 316 disposed on the FL1 314, a second free layer (FL2) 318 disposed on the barrier layer 316, and a cap layer 320 disposed on the FL2 318. A non-magnetic spacer layer 306 is disposed between and in contact with the magnetic seed layer 308 of the DFL structure 310 and the first shield 302. The non-magnetic spacer layer 306 comprises a non-magnetic material or metal, such as Ru, Ta, CoHf, Cr, CoB, or a combination thereof.

The non-magnetic spacer layer 306 may be deposited as a part of the DFL structure 310, or as a part of the first shield 302. The non-magnetic spacer layer 306 extends to the MFS 324, as well as between the RHB structure 322 and the first shield 302. The magnetic seed layer 308 comprises a first portion 308a and a second portion 308b. The first portion 308a of the magnetic seed layer 308 has the same length in x-direction and the same width in the z-direction as the non-magnetic spacer layer 306, while the second portion 308b has the same length in the x-direction and the same width in the z-direction as the non-magnetic seed layer 312, the FL1 314, the barrier layer 316, the FL2 218, and the cap layer 320. The non-magnetic spacer layer 306 and the first portion 308a of the magnetic seed layer 308 each has a greater stripe height 338 extending from the MFS 324 into the read head 300 in the z-direction than a stripe height 340 of the second portion 308b and the layers 312-318 of the DFL structure 310, as shown in FIG. 3B. The non-magnetic spacer layer 306 and the first portion 308a of the magnetic seed layer 308 each further has a greater width 342 in the cross-track direction (i.e., the x-direction) than a width 344 of the second portion 308b and the layers 312-318 of the DFL structure 310 at the MFS 324, as shown in FIG. 3A.

The non-magnetic spacer layer 306 is formed over the first shield 302 to magnetically decouple or to couple, if desired, the magnetic seed layer 308 from the first shield 302. The thickness 328 of the non-magnetic spacer layer 306 in the y-direction is determined based on the level of coupling desired between the first shield 302 and the magnetic seed layer 308. For example, in embodiments where the non-magnetic spacer layer 306 has a thickness 328 greater than or equal to about 2 nm, such as between about 2 nm to about 10 nm or larger, the first shield 302 is fully decoupled from the magnetic seed layer 308. In embodiments where the non-magnetic spacer layer 306 has a thickness 328 between about 1 nm to about 2 nm, the first shield 302 is generally partially coupled to the magnetic seed layer 308. In embodiments where the non-magnetic spacer layer 306 has a thickness 328 less than about 1 nm, including a thickness of greater than about 0 nm, the first shield 302 is fully coupled to the magnetic seed layer 308. As such, the thickness of the non-magnetic spacer layer 306 may be tuned or selected based on the level of coupling needed or desired.

To accommodate for the non-magnetic spacer layer 306 without increasing shield-to-shield spacing 336 between the first and second shields 302, 304, the thickness 332 of the first shield 302 in the y-direction and/or the thickness 334 of the magnetic seed layer 308 in the y-direction may be reduced. For example, when the thickness 332 of the first shield 302 in the y-direction is reduced, the first shield 302 has a thickness 332 between about 10 nm to about 2000 nm, such as about 25 nm. When the thickness 334 of the magnetic seed layer 308 is reduced, the magnetic seed layer 308 has a thickness 334 between about 10 nm to about 60 nm, such as about 15 nm. In general, the overall shield-to-shield spacing may be between about 14 nm to about 25 nm.

The first shield 302 includes a magnetic permeable and electrically conductive material selected from the group that includes NiFe, CoFe, NiFeCo, alloys, and their combinations. The second shield 304 includes a magnetic permeable and electrically conductive material selected from the same group of materials as first shield 302, or the same material exchange biased by a manganese based antiferromagnet such as IrMn, PtMn, and NiMn, or the combination of the two. The thickness of each of the first shield 302 and the second shield 304 may individually be between about 10 nm and about 2000 nm. The first and second shields 302, 304 are deposited by well-known deposition methods such as electroplating, electroless plating, or sputtering, or their combinations. Additionally, it is to be understood that while NiFe, CoFe, NiFeCo, IrMn, PtMn and NiMn have been exemplified as the materials of the first and second shields 302, 304, other materials are contemplated and the embodiments discussed herein are not limited to NiFe, CoFe, NiFeCo, IrMn, PtMn and NiMn for the first and second shields 302, 304.

The magnetic seed layer 308 is formed over the first shield 302 to magnetically decouple the FL1 314 from the first shield 302. The magnetic seed layer 308 is deposited by well-known deposition methods such as sputtering. The magnetic seed layer 308 includes a material selected from the group that includes Co, Fe, Ni, CoHf, CoB, and their multilayers or alloys thereof. The magnetic seed layer 308 may have a thickness between about 10 nm to about 60 nm. Additionally, it is to be understood that while Co, Fe, Ni, CoHf, CoB, and their multilayers and alloys have been exemplified as the magnetic seed layer 308 materials, other materials are contemplated and the embodiments discussed herein are not limited to Co, Fe, Ni CoHf, CoB, or their multilayers or alloys for the magnetic seed layer 308. For example, suitable materials for the magnetic seed layer 308 may also include magnetic alloys of Co, Fe, and Ni with added elements such as Hf, Boron, and Zr. Examples include CoHf, CoB, and CoZr.

The non-magnetic layer 312 includes a material such as Ru, Ta, CoHf, Cr, CoB, or a combination thereof, having a thickness between about 10 Angstroms to about 60 Angstroms. It is to be understood that while Ru, Ta, CoHf, Cr, CoB, or a combination thereof, are exemplified as the non-magnetic layer 312, other non-magnetic materials are contemplated and the material of the non-magnetic layer 312 is not intended to be limiting.

The FL1 314 may be formed by well-known deposition methods such as sputtering. The FL1 314 includes a CoFexB/CoFe multilayer stack, where "x" is between about 0 and about 1 (i.e., the layer may have a non-stoichiometric amount of Fe). The CoFe layer may have a thickness between about 3 Angstroms to about 10 Angstroms. The CoFexB layer may have a thickness between about 30 Angstroms to about 100 Angstroms. Additionally, it is to be understood that while CoFexB/CoFe has been exemplified as the FL1 314 material, other materials are contemplated and the embodiments discussed herein are not limited to CoFexB/CoFe for the FL1 314.

The barrier layer 316 includes a material such as magnesium oxide (MgO) having a thickness between about 10 Angstroms to about 20 Angstroms. It is to be understood that while MgO is exemplified as the barrier layer 316, other insulating materials are contemplated and the embodiments discussed herein are not limited to MgO for the barrier layer 316.

The FL2 318 may be formed by well-known deposition methods such as sputtering. The FL2 318 includes a CoFe/CoFexB multilayer stack, where "x" is between about 0 and about 1 (i.e., the layer may have a non-stoichiometric amount of Fe). The CoFe layer may have a thickness between about 3 Angstroms to about 10 Angstroms. The CoFexB layer may have a thickness between about 30 Angstroms to about 100 Angstroms. Additionally, it is to be understood that while CoFe/CoFexB has been exemplified as the FL2 318 material, other materials are contemplated and the embodiments discussed herein are not limited to CoFe/CoFexB for the FL2 318. The magnetic moments for the FL1 314 and the FL2 318 may be antiparallel due to the antiparallel biasing from synthetic antiferromagnetic (SAF) soft biases (SBs) or side shields 330a, 330b disposed adjacent to both sides of the MFS 324 of the DFL structure 310.

The cap layer 320 is formed on the FL2 318 to magnetically decouple the FL2 318 from the second shield 304. The cap layer 320 may be formed by well-known deposition methods such as sputtering. The cap layer 320 includes a material selected from the group that includes tantalum (Ta), ruthenium (Ru), titanium (Ti), other non-magnetic, electrically conductive materials and their multilayers. The cap layer 320 may have a thickness between about 10 Angstroms to about 100 Angstroms. Additionally, it is to be understood that while Ta, Ru, Ti and their multilayers have been exemplified as the cap layer 320 materials, other materials are contemplated and the embodiments discussed herein are not limited to Ta, Ru, or Ti or their multilayers for the cap layer 320. For example, suitable materials for the cap layer 320 may also include non-magnetic alloys of Co, Fe, and Ni with added elements such as Hf and Zr. Examples include CoHf and CoZr.

Figure 4:
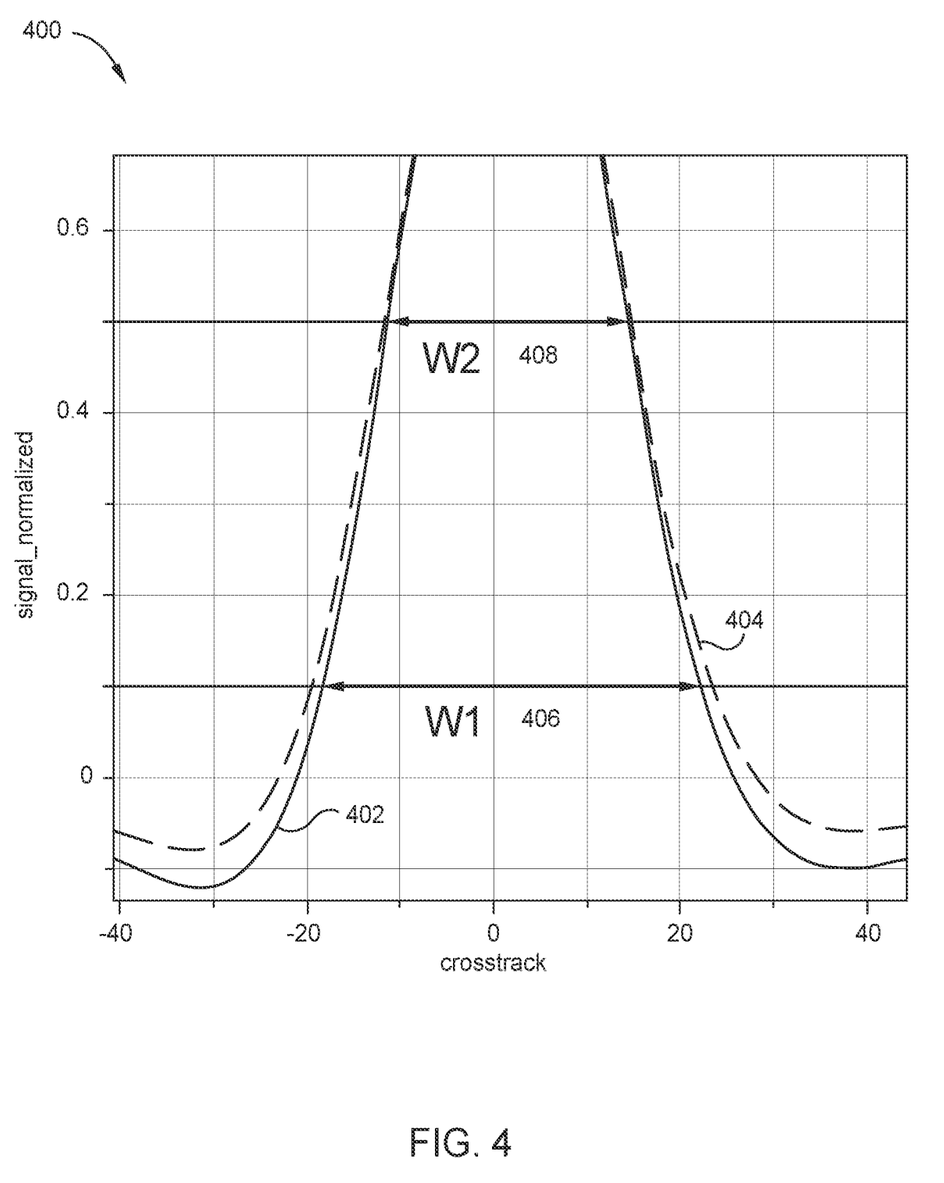
FIG. 4 illustrates a graph of a normalized signal of the magnetic read head as a function of cross-track location in nm, according to one embodiment.

FIG. 4 illustrates a graph 400 of a normalized signal of the magnetic read head as a function of cross-track location in nm, according to one embodiment. For description purposes, the magnetic read head is the magnetic read head 300 of FIGS. 3A-3B. In the graph 400, line 402 shows the magnetic seed layer 308 being fully decoupled from the first shield 302, and line 404 shows the magnetic seed layer 308 being fully coupled to the first shield 302. For example, line 402 may illustrate the non-magnetic spacer layer 306 having a thickness of greater than about 2 nm, and line 404 may illustrate the non-magnetic spacer layer 306 having a thickness less than about 1 nm, or having a thickness of 0 nm. Line 402 has a first width 406 of about 40 nm measured at a signal of about 0.1, and a second width (i.e., magnetic reader width (MRW)) 408 of about 26 nm measured at a signal of about 0.5. A skirt ratio of the line 402 is a ratio of the first width 406 divided by the second width 408. Generally, a lower skirt ratio leads to a higher resolution read head in cross track direction (i.e., x-direction). As such, the magnetic seed layer 308 being fully decoupled from the first shield 302 illustrated by line 402 has a lower skirt ratio and a lower MRW than the line 404.

Figure 5A:
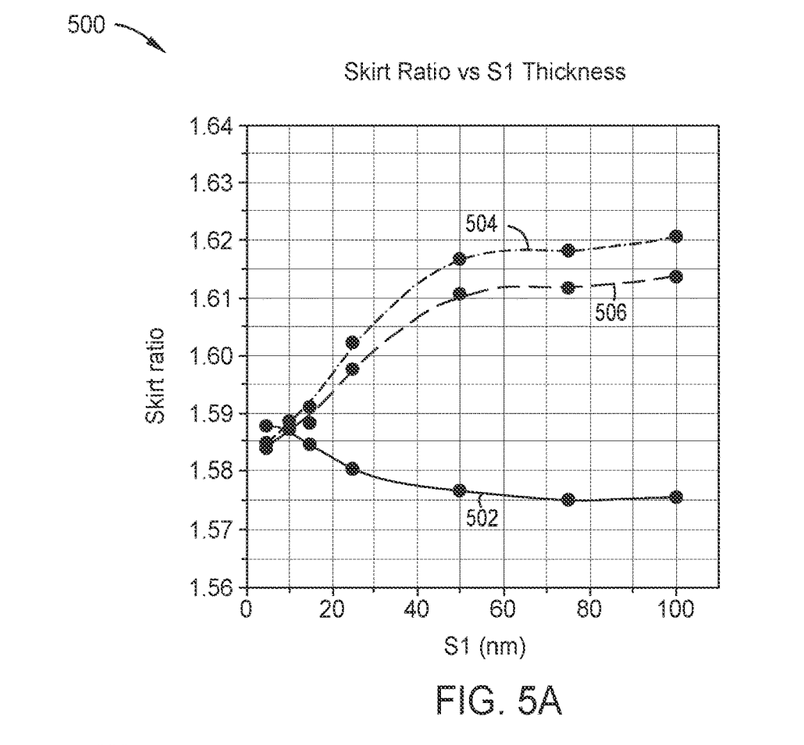
FIGS. 5A-5C illustrate various graphs comparing a magnetic read head having various coupling strengths between a magnetic seed layer and a first shield, according to various embodiments.
Figure 5B:
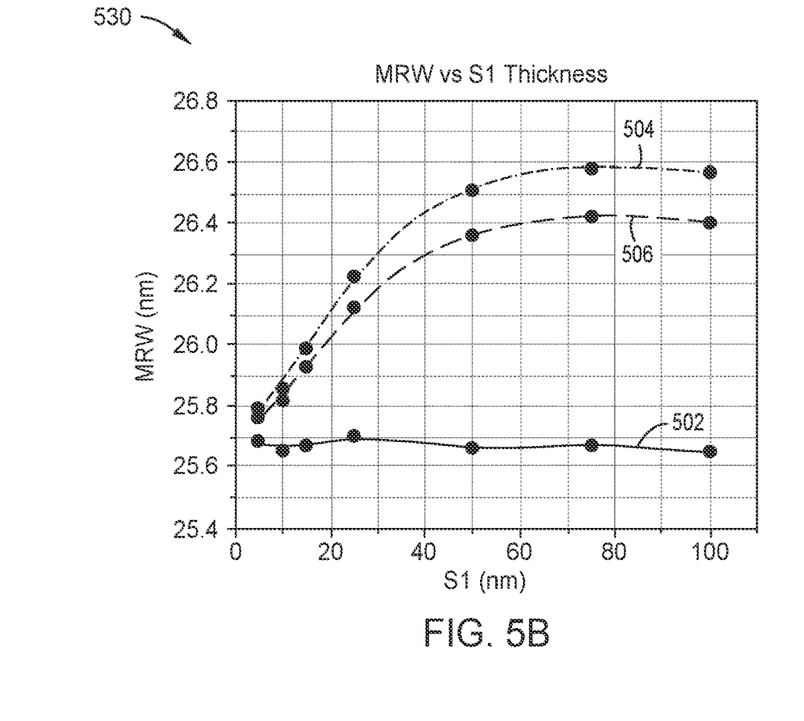
Figure 5C:
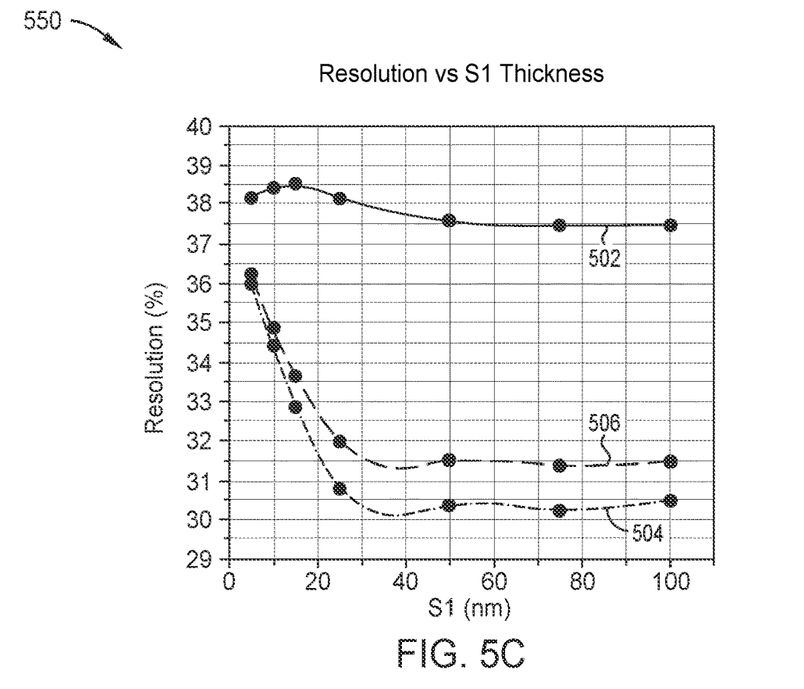

FIGS. 5A-5C illustrate various graphs 500, 530, 550, respectively, comparing a magnetic read head having various coupling strengths between a magnetic seed layer and a first shield, according to various embodiments. For description purposes, the magnetic read head is the magnetic read head 300 of FIGS. 3A-3B. In each graph 500, 530, 550, line 502 shows the magnetic seed layer 308 being fully decoupled from the first shield 302 (e.g., zero coupling), line 504 shows the magnetic seed layer 308 being fully coupled from the first shield 302 (e.g., a coupling strength of about 1), and line 506 shows the magnetic seed layer 308 being partially coupled (e.g., a coupling strength of about 0.4)

from the first shield 302. For example, line 502 may illustrate the non-magnetic spacer layer 306 having a thickness of greater than about 2 nm, line 504 may illustrate the non-magnetic spacer layer 306 having a thickness less than about 1 nm, and line 506 may illustrate the non-magnetic spacer layer 306 having a thickness between about 1 nm to about 2 nm.

Graph 500 illustrates a skirt ratio of the magnetic read head 300 head versus a thickness of the first shield 302 in nm. The skirt ratio is described in FIG. 4 above. Graph 530 illustrates a magnetic reader width (MRW) in nm of the magnetic read head 300 versus a thickness of the first shield 302 in nm. Graph 550 illustrates a down track (y-direction) linear resolution of the magnetic read head 300 as a percentage versus a thickness of the first shield 302 in nm. As shown in each graph 500, 530, 550, line 502 has a lower skirt ratio, a higher linear resolution, and a lower reader width at each thickness of the first shield. Thus, the magnetic seed layer 308 being fully decoupled from the first shield 302 illustrated by line 502 has an improved performance compared to the partially coupled and fully coupled read heads shown by lines 504 and 506. Regarding the coupled and partially coupled read heads illustrated by lines 504 and 506, a thickness of the first shield 302 may be reduced or decreased to enhance performance.

Figure 6A:
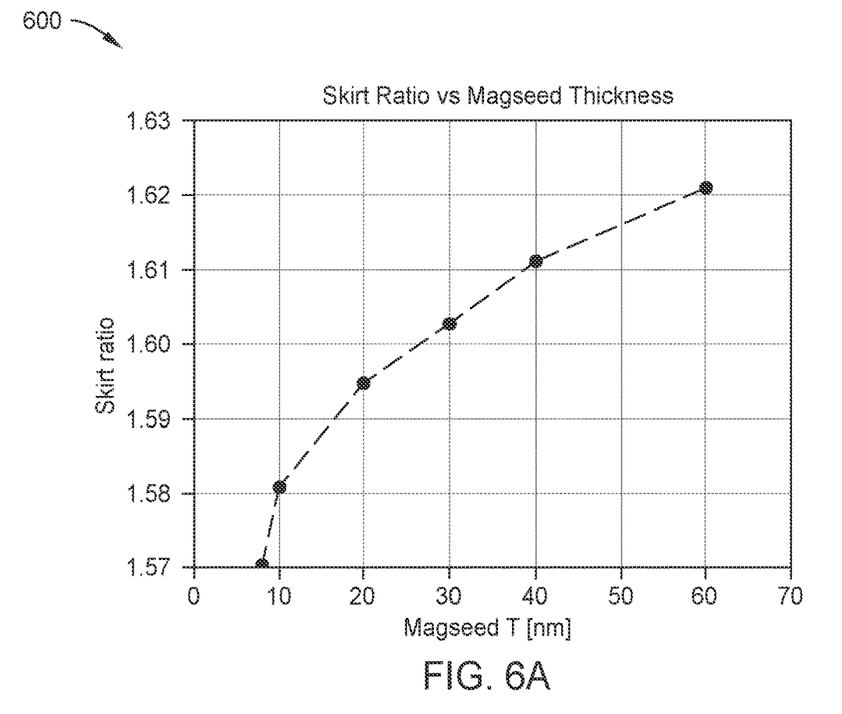
FIGS. 6A-6C illustrate various graphs comparing various characteristics of a magnetic read head having a decoupled magnetic seed layer and first shield, according to various embodiments.
Figure 6B:
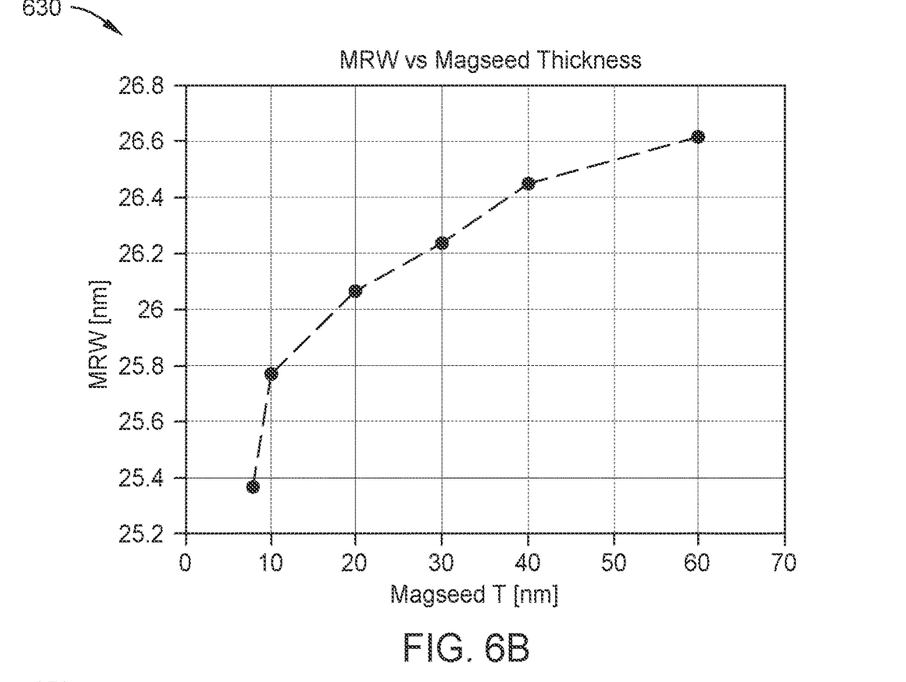
Figure 6C:
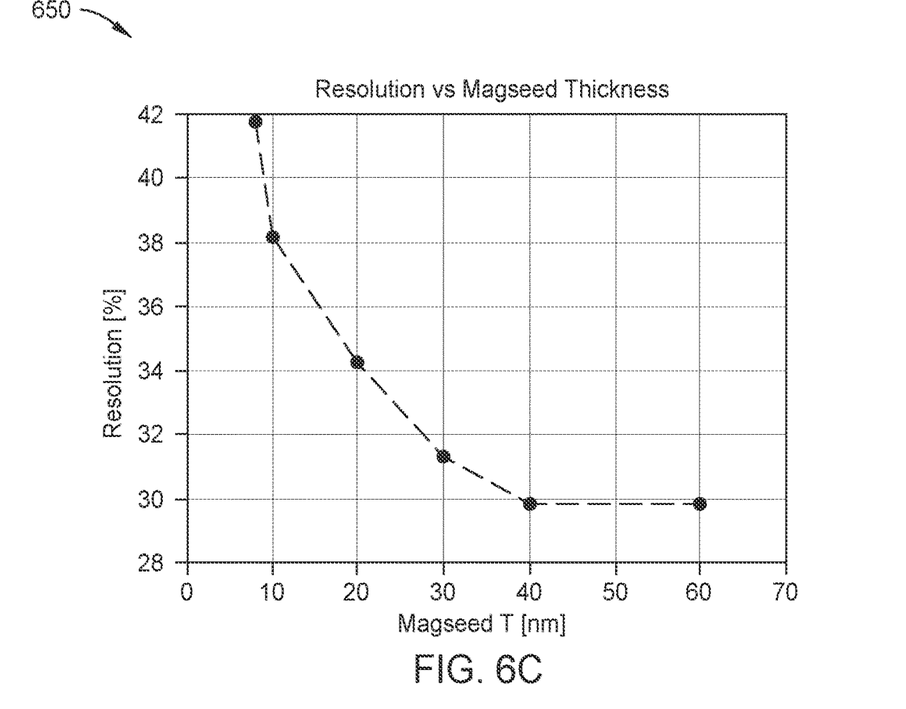

FIGS. 6A-6C illustrate various graphs 600, 630, 650, respectively, comparing various characteristics of a magnetic read head having a decoupled magnetic seed layer and first shield, according to various embodiments. For description purposes, the magnetic read head is the magnetic read head 300 of FIGS. 3A-3B. In each of graphs 600, 630, 650, the first shield 302 used in this embodiment has a thickness of about 25 nm, and the non-magnetic spacer layer 306 has a thickness greater than about 2 nm to illustrate the decoupled embodiment.

Graph 600 illustrates a skirt ratio of the magnetic read head 300 versus a thickness of the magnetic seed (magseed) layer 308 in nm. The skirt ratio is described in FIG. 4 above. Graph 630 illustrates a magnetic reader width (MRW) in nm of the magnetic read head 300 versus a thickness of the magnetic seed layer 308 in nm. Graph 650 illustrates a down track resolution percentage of the magnetic read head 300 versus a thickness of the magnetic seed layer 308 in nm. As shown in graphs 600, 630, 650, a lower magnetic seed layer 308 thickness results in the read head having a magnetic seed layer 308 being fully decoupled from the first shield 302 having a lower skirt ratio, a higher resolution, and a lower reader width.

Therefore, a magnetic read head comprising a non-magnetic spacer layer disposed between at the MFS between the first shield and the magnetic seed layer of a DFL structure allows the coupling between the first shield and the magnetic seed layer to be accurately controlled as desired. As such, the non-magnetic spacer layer enables the first shield and the magnetic seed layer to be fully decoupled, resulting in the magnetic read head having a lower skirt ratio, a higher down track resolution, a lower reader width, and an overall improved performance.

In one embodiment, a magnetic read head assembly comprises a first shield, a second shield disposed over the first shield, and a DFL structure disposed between the first shield and the second shield at a MFS. The DFL structure comprises a magnetic seed layer disposed over the first shield, a first free layer disposed over the magnetic seed layer, and a second free layer disposed over the first free layer. The magnetic read head assembly further comprises a non-magnetic spacer layer disposed between the first shield and the magnetic seed layer of the DFL structure at the MFS.

The non-magnetic spacer layer has a thickness greater than or equal to about 2 nm. The first shield has a thickness between about 10 nm to about 2000 nm. The magnetic seed layer has a thickness between about 10 nm to about 60 nm. The non-magnetic spacer layer is configured to decouple the first shield from the magnetic seed layer. The non-magnetic spacer layer has a greater stripe height extending from the MFS into the magnetic read head assembly than first and second free layers and a greater width in a cross-track direction at the MFS than the first and second free layers. The DFL structure further comprises a non-magnetic seed layer disposed between the magnetic seed layer and the first free layer, a barrier layer disposed between the first free layer and the second free layer, and a cap layer disposed between the second free layer and the second shield. A material and a thickness of the non-magnetic spacer layer is selected to control a coupling strength between the first shield and the magnetic seed layer. The magnetic read head assembly further comprises a rear hard bias structure disposed adjacent to the DFL structure, the RHB structure being recessed from the MFS. The non-magnetic spacer layer is deposited as a part of the first shield.

In another embodiment, a magnetic read head assembly comprises a first shield, a non-magnetic spacer layer disposed on and in contact with the first shield, the non-magnetic spacer layer being disposed at a MFS, and a TMR sensor disposed on the non-magnetic spacer layer at the MFS. The TMR sensor comprises a magnetic seed layer disposed over the non-magnetic spacer layer, a first free layer disposed on and in contact with the magnetic seed layer, and a second free layer disposed over the first free layer. The magnetic read head assembly further comprises a second shield disposed over the second free layer of the TMR sensor, wherein the non-magnetic spacer layer is configured to control a coupling of the first shield and the magnetic seed layer.

The first and second free layers have a first cross-track width at the MFS and a first stripe height extending from the MFS into the magnetic read head assembly. The non-magnetic spacer layer has a second cross-track width at the MFS greater than the first cross-track width and a second stripe height greater than the first stripe height. The non-magnetic spacer layer has a thickness greater than or equal to about 2 nm to decouple the first shield and the magnetic seed layer. The non-magnetic spacer layer comprises a material selected from the group consisting of Ru, Ta, CoHf, Cr, CoB, or a combination thereof. The TMR sensor further comprises a non-magnetic seed layer disposed between and in contact with the magnetic seed layer and the first free layer, a barrier layer disposed between and in contact with the first free layer and the second free layer, and a cap layer disposed between and in contact with the second free layer and the second shield. The non-magnetic spacer layer is deposited as a part of the TMR sensor. The non-magnetic spacer layer extends adjacent to a RHB structure, the RHB structure being recessed from the MFS. A shield-to-shield spacing of the first shield and the second shield is between about 14 nm to about 25 nm. A material and a thickness of the non-magnetic spacer layer is selected to control a coupling strength between the first shield and the magnetic seed layer.

In another embodiment, a magnetic read head assembly comprises a first shield, a second shield disposed over the first shield, and a DFL structure disposed between the first shield and the second shield at a MFS. The DFL structure comprises a magnetic seed layer disposed over the first shield, a non-magnetic seed layer disposed on and in contact with the magnetic seed layer, a first free layer disposed on and in contact with the non-magnetic seed layer, a barrier layer disposed on and in contact with the first free layer, a second free layer disposed on and in contact with the barrier layer, and a cap layer disposed on and in contact with the second free layer. The magnetic read head assembly further comprises a non-magnetic spacer layer disposed between and in contact with the first shield and the magnetic seed layer of the DFL structure at the MFS, the non-magnetic spacer layer having a thickness greater than or equal to about 2 nm.

The non-magnetic spacer layer is deposited as a part of the DFL structure or as a part of the first shield. The first shield has a thickness between about 10 nm to about 2000 nm, and the magnetic seed layer has a thickness between about 10 nm to about 60 nm. The magnetic read head assembly further comprises a RHB structure disposed adjacent to the DFL structure, the RHB structure being recessed from the MFS. The first and second free layers have a first cross-track width at the MFS and a first stripe height extending from the MFS under the RHB structure. The non-magnetic spacer layer has a second cross-track width at the MFS greater than the first cross-track width and a second stripe height greater than the first stripe height. The non-magnetic spacer layer is configured to control a coupling of the first shield and the magnetic seed layer. The non-magnetic spacer layer comprises a material selected from the group consisting of Ru, Ta, CoHf, Cr, CoB, or a combination thereof.

While the foregoing is directed to embodiments of the present disclosure, other and further embodiments of the disclosure may be devised without departing from the basic scope thereof, and the scope thereof is determined by the claims that follow.

What is claimed is:

1. A magnetic read head assembly, comprising:
   a first shield;
   a second shield disposed over the first shield;
   a dual free layer (DFL) structure disposed between the first shield and the second shield at a media facing surface (MFS), the DFL structure comprising:
      a magnetic seed layer disposed over the first shield;
      a first free layer disposed over the magnetic seed layer, the first free layer being disposed in contact with a non-magnetic seed layer; and
      a second free layer disposed over the first free layer; and
   a non-magnetic spacer layer disposed between the first shield and the magnetic seed layer of the DFL structure at the MFS.

2. The magnetic read head assembly of claim 1, wherein the non-magnetic spacer layer has a thickness greater than or equal to about 2 nm, wherein the first shield has a thickness between about 10 nm to about 2000 nm, and wherein the magnetic seed layer has a thickness between about 10 nm to about 60 nm.

3. The magnetic read head assembly of claim 1, wherein the non-magnetic spacer layer is configured to decouple the first shield from the magnetic seed layer, and wherein the non-magnetic spacer layer has a greater stripe height extending from the MFS into the magnetic read head assembly than the first and second free layers and a greater width in a cross-track direction at the MFS than the first and second free layers.

4. The magnetic read head assembly of claim 1, wherein the DFL structure further comprises:
   a barrier layer disposed between the first free layer and the second free layer; and
   a cap layer disposed between the second free layer and the second shield, wherein the non-magnetic seed layer is disposed in contact with the magnetic seed layer, and wherein a material and a thickness of the non-magnetic spacer layer is selected to control a coupling strength between the first shield and the magnetic seed layer.

5. The magnetic read head assembly of claim 1, further comprising a rear hard bias (RHB) structure disposed adjacent to the DFL structure, the RHB structure being recessed from the MFS.

6. The magnetic read head assembly of claim 1, wherein the non-magnetic spacer layer is deposited as a part of the first shield.

7. A magnetic recording device, comprising:
   a magnetic read head assembly comprising:
      a first shield;
      a second shield disposed over the first shield;
      a dual free layer (DFL) structure disposed between the first shield and the second shield at a media facing surface (MFS), the DFL structure comprising:
         a magnetic seed layer disposed over the first shield;
         a first free layer disposed over the magnetic seed layer, the first free layer being disposed in contact with a non-magnetic seed layer; and
         a second free layer disposed over the first free layer; and
      a non-magnetic spacer layer disposed between the first shield and the magnetic seed layer of the DFL structure at the MFS.

8. A magnetic read head assembly, comprising:
   a first shield;
   a non-magnetic spacer layer disposed on and in contact with the first shield, the non-magnetic spacer layer being disposed at a media facing surface (MFS);
   a tunnel magnetic resistive (TMR) sensor disposed on the non-magnetic spacer layer at the MFS, the TMR sensor comprising:
      a magnetic seed layer disposed on and in contact with the non-magnetic spacer layer;
      a non-magnetic seed layer disposed on and in contact with the magnetic seed layer;
      a first free layer disposed over the magnetic seed layer, the first free layer being disposed in contact with the non-magnetic seed layer; and
      a second free layer disposed over the first free layer; and
   a second shield disposed over the second free layer of the TMR sensor,
   wherein the non-magnetic spacer layer is configured to control a coupling of the first shield and the magnetic seed layer.

9. The magnetic read head assembly of claim 8, wherein the first and second free layers have a first cross-track width at the MFS and a first stripe height extending from the MFS into the magnetic read head assembly, and wherein the non-magnetic spacer layer has a second cross-track width at the MFS greater than the first cross-track width and a second stripe height greater than the first stripe height.

10. The magnetic read head assembly of claim 9, wherein the non-magnetic spacer layer has a thickness greater than or equal to about 2 nm to decouple the first shield and the magnetic seed layer, and wherein the non-magnetic spacer layer comprises a material selected from the group consisting of Ru, Ta, CoHf, Cr, CoB, or a combination thereof.

11. The magnetic read head assembly of claim 8, wherein the TMR sensor further comprises:
- a barrier layer disposed between and in contact with the first free layer and the second free layer; and
- a cap layer disposed between and in contact with the second free layer and the second shield, wherein the non-magnetic spacer layer is deposited as a part of the TMR sensor.

12. The magnetic read head assembly of claim 8, wherein the non-magnetic spacer layer extends adjacent to a rear hard bias (RHB) structure, the RHB structure being recessed from the MFS, wherein a shield-to-shield spacing of the first shield and the second shield is between about 14 nm to about 25 nm.

13. The magnetic read head assembly of claim 8, wherein a material and a thickness of the non-magnetic spacer layer is selected to control a coupling strength between the first shield and the magnetic seed layer.

14. A magnetic recording device, comprising:
a magnetic read head assembly comprising:
- a first shield;
- a non-magnetic spacer layer disposed on and in contact with the first shield, the non-magnetic spacer layer being disposed at a media facing surface (MFS);
- a tunnel magnetic resistive (TMR) sensor disposed on the non-magnetic spacer layer at the MFS, the TMR sensor comprising:
  - a magnetic seed layer disposed on and in contact with the non-magnetic spacer layer;
  - a non-magnetic seed layer disposed on and in contact with the magnetic seed layer;
  - a first free layer disposed over the magnetic seed layer, the first free layer being disposed in contact with the non-magnetic seed layer; and
  - a second free layer disposed over the first free layer; and
- a second shield disposed over the second free layer of the TMR sensor,
wherein the non-magnetic spacer layer is configured to control a coupling of the first shield and the magnetic seed layer.

15. A magnetic read head assembly, comprising:
a first shield;
a second shield disposed over the first shield;
a dual free layer (DFL) structure disposed between the first shield and the second shield at a media facing surface (MFS), the DFL structure comprising:
- a magnetic seed layer disposed over the first shield;
- a non-magnetic seed layer disposed on and in contact with the magnetic seed layer;
- a first free layer disposed on and in contact with the non-magnetic seed layer;
- a barrier layer disposed on and in contact with the first free layer;
- a second free layer disposed on and in contact with the barrier layer; and
- a cap layer disposed on and in contact with the second free layer; and
a non-magnetic spacer layer disposed between and in contact with the first shield and the magnetic seed layer of the DFL structure at the MFS, the non-magnetic spacer layer having a thickness greater than or equal to about 2 nm.

16. The magnetic read head assembly of claim 15, wherein the non-magnetic spacer layer is deposited as a part of the DFL structure or as a part of the first shield.

17. The magnetic read head assembly of claim 15, wherein the first shield has a thickness between about 10 nm to about 2000 nm, and the magnetic seed layer has a thickness between about 10 nm to about 60 nm.

18. The magnetic read head assembly of claim 15, further comprising a rear hard bias (RHB) structure disposed adjacent to the DFL structure, the RHB structure being recessed from the MFS, wherein the first and second free layers have a first cross-track width at the MFS and a first stripe height extending from the MFS under the RHB structure, and wherein the non-magnetic spacer layer has a second cross-track width at the MFS greater than the first cross-track width and a second stripe height greater than the first stripe height.

19. The magnetic read head assembly of claim 15, wherein the non-magnetic spacer layer is configured to control a coupling of the first shield and the magnetic seed layer, and wherein the non-magnetic spacer layer comprises a material selected from the group consisting of Ru, Ta, CoHf, Cr, CoB, or a combination thereof.

20. A magnetic recording device, comprising:
a magnetic read head assembly, comprising:
a first shield;
a second shield disposed over the first shield;
a dual free layer (DFL) structure disposed between the first shield and the second shield at a media facing surface (MFS), the DFL structure comprising:
- a magnetic seed layer disposed over the first shield;
- a non-magnetic seed layer disposed on and in contact with the magnetic seed layer;
- a first free layer disposed on and in contact with the non-magnetic seed layer;
- a barrier layer disposed on and in contact with the first free layer;
- a second free layer disposed on and in contact with the barrier layer; and
- a cap layer disposed on and in contact with the second free layer; and
a non-magnetic spacer layer disposed between and in contact with the first shield and the magnetic seed layer of the DFL structure at the MFS, the non-magnetic spacer layer having a thickness greater than or equal to about 2 nm.

* * * * *